Figure 1:
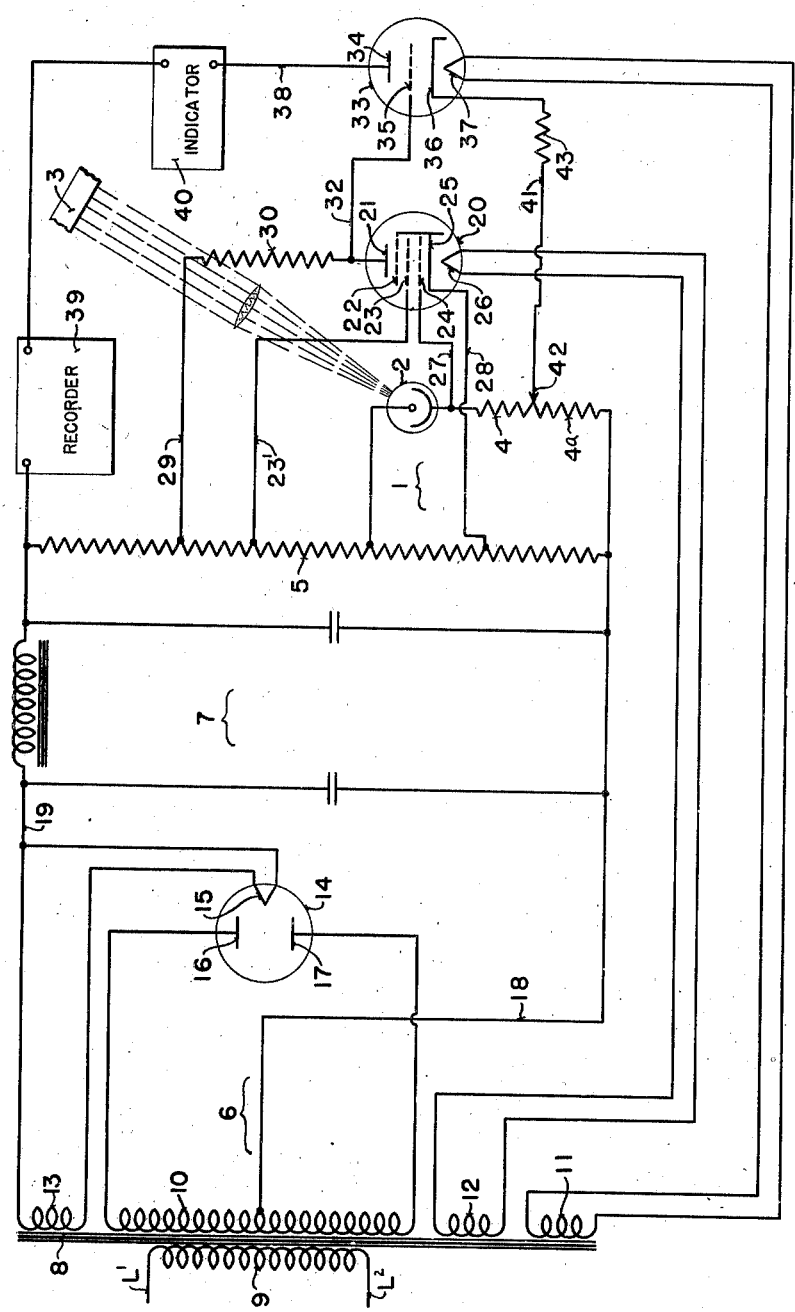

June 24, 1941.       T. R. HARRISON       2,246,680
MEASURING APPARATUS
Filed Nov. 26, 1937       2 Sheets-Sheet 2

*INVENTOR.*
THOMAS R. HARRISON
BY *George M. Murchamp*
*ATTORNEY.*

Patented June 24, 1941

2,246,680

UNITED STATES PATENT OFFICE 2,246,680

MEASURING APPARATUS

Thomas R. Harrison, Wyncote, Pa., assignor to The Brown Instrument Company, Philadelphia, Pa., a corporation of Pennsylvania Application November 26, 1937, Serial No. 176,772

16 Claims. (Cl. 88—23)

The present invention relates to instrumentalities useful in measuring and/or recording the magnitude of a variable condition, and more particularly to photometric measuring apparatus adapted to operate through the medium of a photoelectric cell to provide a quick and accurate measurement of the radiant energy impinging on the cell and thereby of the physical magnitude of the source from which the radiant energy is emanating.

A general object of the invention is to provide a self balancing bridge network including a condition responsive device in one arm and a device in an opposing arm the effectiveness of which is adapted to be varied by physically stationary means responsive to bridge unbalance to maintain the bridge in a balanced condition.

A specific object of the invention is to provide an improved measuring instrument including a Wheatstone bridge network having a photoelectric cell in one arm which is adapted to be exposed to radiation from a hot body whose temperature is to be measured, and a resistance in an opposing arm of the bridge the potential drop across which is adapted to be continuously varied by physically stationary means responsive to bridge unbalance to maintain the bridge balanced.

Instruments of this general type which have been devised heretofore have been embodied in arrangements including a Wheatstone bridge network having photoelectric cells connected in each of two opposed bridge arms adapted to be exposed respectively to radiation from a standard source of light and from an incandescent body the physical magnitude of which is under measurement. In one such prior art device the radiation from the standard source of light is adapted to be varied by means responsive to bridge unbalance produced by a change in the radiation from the incandescent body to change the radiation impinging on the respective photoelectric cell to a corresponding extent for rebalancing the bridge.

My invention is embodied in an instrument of this general type in which the bridge network is rebalanced by means responsive to bridge unbalance without the use of a standard rebalancing lamp and wherein a fixed resistance may be employed in lieu of the corresponding photoelectric cell thereby effecting a material reduction in the amount of apparatus involved.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 2:
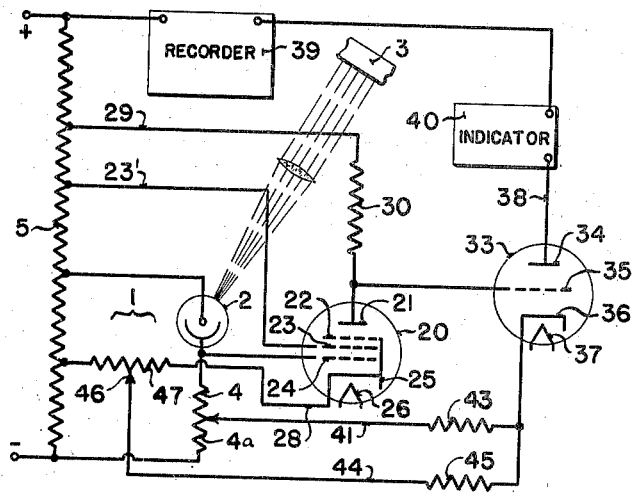
Figure 3:
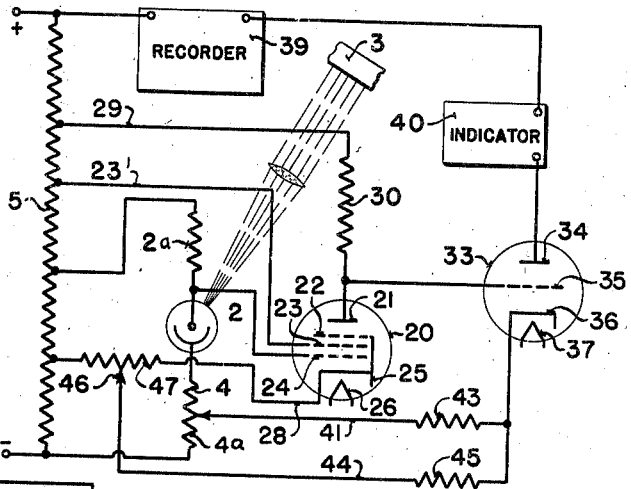
Figure 4:
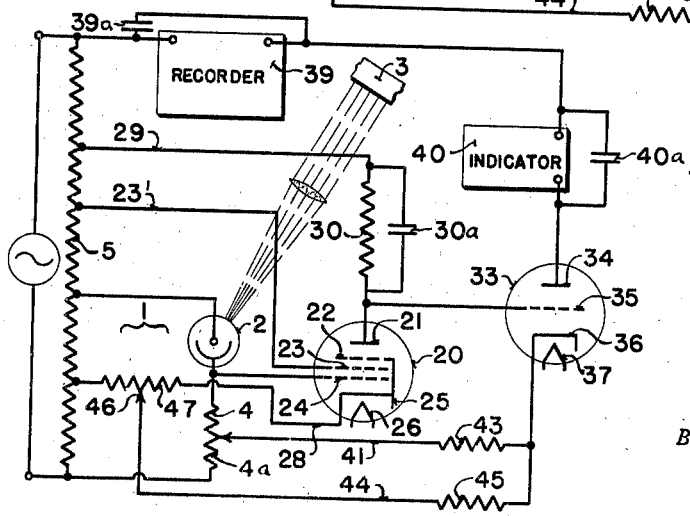

Of the drawings:

Fig. 1 is a more or less diagrammatic illustration of one embodiment of my invention; and Figs. 2–4 illustrate modifications of the arrangement of Fig. 1.

In Fig. 1 of the drawings I have illustrated, more or less diagrammatically, a photoelectric pyrometer including a Wheatstone bridge network 1 having a photoelectric cell 2 in one arm which is adapted to be illuminated by an incandescent body 3 the temperature of which is to be measured, and having a resistance 4 the current flow through all or a portion of which is adapted to be varied, independently of the bridge energizing current, by means responsive to bridge unbalance for effecting bridge rebalance.

Energizing voltage is supplied the bridge network 1 by a voltage divider 5 which is connected to the terminals of a suitable rectifier 6 through a suitable electric filter 7 interposed therebetween for producing a smooth direct current, and, as illustrated, a portion of the divider 5 may comprise the remaining arms of the bridge network. Rectifier 6 is supplied energizing voltage from the secondary winding 10 of a transformer 8 which is shown as a combination step-up and step-down transformer having a line voltage primary winding 9 connected to alternating voltage supply conductors $L^1$ and $L^2$, the high voltage secondary winding 10, and low voltage secondary windings 11, 12 and 13, the latter of which supplies energizing current to the filament cathode 15 of a rectifier valve 14.

The rectifier valve 14 may be and is shown as of standard type and includes a pair of anodes 16 and 17 in addition to the filament cathode 15. One terminal of the high voltage secondary winding 10 is connected to the anode 16 and the other terminal is connected to the anode 17. A center tap on the winding 10 constitutes the negative terminal of the rectifier and is connected by a conductor 18 to one terminal of the filter 7 and the other terminal of the latter is connected by a conductor 19 to the filament cathode 15 of valve 14 which constitutes the positive side of the rectifier. The voltage divider 5 is connected between the terminals of the filter 7, and as will be clear, the direct current voltage supplied the divider will be substantially free from alternating components due to the filtering action of the filter.

The means referred to above as being responsive to unbalance of bridge network 1 includes an electronic valve 20 which is shown as a heater type pentode including an anode 21, a suppressor grid 22, a screen grid 23, a control grid 24, a cathode 25 and a heater filament 26. Energizing voltage is supplied the heater filament 26 by the low voltage transformer secondary winding 12.

As illustrated, the point of connection of the photocathode of cell 2 and resistor 4 is connected by a conductor 27 to the control grid 24 of valve 20, and the cathode 25 is connected by a conductor 28 to a point on divider 5 between the points of connection of the anode of cell 2 and the other end of resistor 4. It is noted that this end of resistor 4 is connected to the negative terminal of divider 5 and that the potential of the anode of cell 2 will be positive with respect thereto.

Anode voltage is supplied valve 20 from the divider 5 by a conductor 29, connected to a point on the divider which is positive with respect to the point of connection of the anode of cell 2, and in which a resistor 30 is inserted. The return circuit from valve 20 to the divider 5, as is obvious, is by way of cathode 25 and conductor 28. The screen grid 23 is connected by a conductor 23¹ to a point on the divider which may be at a somewhat lower potential than the point of connection of conductor 29, and the suppressor grid 22 may be connected directly to the cathode 25.

The negative end of resistor 30, which is connected in the anode circuit of valve 20, is connected by a conductor 32 to the control grid 35 of an electronic valve 33. The electronic valve 33 is a heater type triode and includes an anode 34, a control grid 35, a cathode 36 and a heater filament 37 which is supplied energizing current by the low voltage transformer secondary winding 11. Anode voltage is supplied valve 33 from the divider 5 by a conductor 38 in which a milliammeter recorder 39 and a milliammeter indicator 40 are preferably inserted, and, as illustrated, the cathode 36 is connected by a conductor 41, in which a cathode biasing resistor 43 is inserted, to a contact 42 which is adjustable along the resistor 4.

The milliammeter recorder 39 and the milliammeter indicator 40 are connected in the anode circuit of valve 33 to measure the current conducted by the latter and thereby the changes in the potential drop across the portion of resistance 4 between the contact 42 and the negative end of the voltage divider 5. This portion of resistance 4 will for convenience be designated by the reference numeral 4a. As will become apparent the potential drop across the resistance 4 will then provide a measure of the radiant light impinging on the photoelectric cell 2 and thereby of the temperature of the incandescent body 3. It will be clear that the milliammeter readings may be calibrated in terms of temperature to thereby provide a record or indication of the temperature of the incandescent body 3 directly.

In operation, when light from the incandescent body 3 is focussed on the photoelectric cell 2, this unit accordingly becomes more conductive and thereby renders the control grid 24 of valve 20 more positive relative to the cathode 25 resulting in an increase in the current conducted by the valve and a consequent increase in the potential drop in resistor 30. There... n the control grid 35 of valve 33 becomes le... tive relative to the cathode 36, resulting in... ease in current conducted by the valve a... .hereby through the resistance 4a. This decrease in current through resistance 4a results in a corresponding decrease in the potential drop across the resistance, and as a result the potential of the control grid 24 is driven less positive with respect to the potential of cathode 25, and since valve 20 controls the potential of the control grid 35 of valve 33, the latter is made more positive. This action establishes a balance between the illumination of cell 2 and the potential drop across resistor 4, and as will be clear, the current conducted by valve 33 will then provide an indication of the value of the light being received by the cell 2.

It will be noted, however, that in order for the output current of valve 33 to remain at a new value corresponding to the new value of illumination of photoelectric cell 2, the potential impressed on the input circuit of valve 20 must assume a value which is slightly different from its value before the change occurred, that is, upon an increase in illumination of cell 2 as above described, the potential of the control grid 24 of valve 20 must be slightly more positive with respect to the cathode potential after such change in illumination than it was prior to the change. In other words the circuit action thus far described tends to rebalance the bridge network 1 upon a change in illumination of photoelectric cell 2, but a slight unbalance of the network is required for maintaining the new output current value of the valve 33 and thereby the new value of potential impressed on the resistor 4 so that in effect the bridge network 1 will never be exactly balanced.

For all practical purposes, however, the unbalance of the bridge network 1 required for varying the output current of valve 33 through its entire range is relatively small, but if it is desired to exactly rebalance the bridge network 1 upon a change in the illumination of photoelectric cell 2, it is noted this result may be attained by the addition of a circuit branch in the cathode circuit of valve 33 as illustrated in Fig. 2 of the drawings. The current passed through this circuit branch produces a change in voltage impressed on the input circuit of valve 20 independently of the bridge network energizing voltage so that the potential impressed on the resistor 4 by the current passed by valve 33 may be so varied on a change in the illumination of photoelectric cell 2 as to exactly rebalance the bridge network. As illustrated in Fig. 2, the cathode 36 of valve 33 is connected by a conductor 44, in which a resistor 45 is inserted, to a contact 46 shown adjustable along a resistor 47 connected in the cathode circuit of valve 20.

With this circuit arrangement the value of resistor 45 and the position of contact 46 along resistor 47 are so adjusted that on a change in the illumination of photoelectric cell 2 and a corresponding unbalance of the bridge network 1, the output current of valve 33 will be varied in the proper sense to change the impressed potential on the resistor 4 as required to exactly rebalance the bridge network 1, and simultaneously, the change in the current through resistor 47 from the valve 33 will change the bias voltage impressed on the input circuit of valve 20 in the proper sense and by an amount sufficient to maintain the changed current flow through the valve 33.

From the foregoing description it will be clear that the device of my present invention is a self balancing bridge network which is adapted to be continuously rebalanced by means responsive to bridge unbalance without needing to employ physically moving contacts or other auxiliary apparatus.

Although my invention has been described in connection with photoelectric cells of the electron emissive type, it will be clearly apparent it is not limited to such use and that photoconductive type tubes such as selenium cells, or a substance, the resistance of which is varied or varies in itself in accordance with changes in temperature or other variable condition under measurement, may be used with equal facility.

Furthermore, although the invention has been described showing a device, the conductivity of which changes in accordance with changes in a variable condition, in one arm of the bridge network 1, and a device in an opposing arm of the network, the potential drop across which is adapted to be varied for rebalancing the bridge network, it will be clearly apparent both of the devices referred to may be included in the same arm as illustrated in Fig. 3, if desired. When it is desired to use such an arrangement, a resistor 2a of suitable value may be connected in the bridge network arm in which the photoelectric cell 2 is shown connected in Fig. 1, and the photoelectric cell may be connected in the arm including the resistor 4 and in series therewith. With this arrangement, on an increase in the illumination of photoelectric cell 2 and a resultant increase in the conductivity thereof, the potential drop in this bridge network arm will be decreased and the control grid 24 of valve 20 will be rendered less positive relative to the cathode 25, resulting in a decrease in the current conducted by the valve and accordingly in a decrease in the potential drop in resistor 30. Thereupon the control grid 35 of valve 33 will become more positive relative to the cathode 36, and an increased current will be conducted by this valve. This increased current increases the impressed potential on the resistance 4 whereby the bridge network is rebalanced, and also increases to the desired extent the potential impressed on the resistance 47. The control grid 24 is thus rendered sufficiently less positive relative to the cathode 25 so that the increased output current of valve 33 may be maintained. The system will then be in equilibrium and the bridge network will be exactly balanced.

It will be apparent to those skilled in the art that the invention is not restricted to use in which the divider 5 is energized from a direct current source, as shown in the drawings, for the divider 5 may be energized directly from a suitable alternating current voltage source as illustrated in Fig. 4, if desired. When the divider 5 is energized from an alternating current voltage source, condensers 30a, 39a, and 40a of suitable value are preferably connected across the resistor 30, the milliammeter recorder 39, and the milliammeter indicator 40, respectively, for smoothing out the pulsating current flow through these devices.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Apparatus for measuring the magnitude of a variable condition including the combination of an electronic amplifier having an input circuit and an output circuit, a source of energizing voltage, a self balancing Wheatstone bridge network receiving energizing current from said source and having its equalizing terminals connected to the input circuit of said amplifier, means included in one arm of said network adapted to change in resistance in accordance with variations in said condition and adapted to unbalance said network to a corresponding extent, a resistance disposed in an opposed arm of said network, and means for passing the output current from said amplifier through a portion of said resistance for rebalancing said network.

2. Apparatus for measuring the magnitude of a variable condition including the combination of an electronic amplifier having an input circuit and an output circuit, a source of energizing voltage, a self balancing Wheatstone bridge network receiving energizing current from said source and having its equalizing terminals connected to the input circuit of said amplifier, means included in one arm of said network adapted to change in resistance in accordance with variations in said condition and adapted to unbalance said network to a corresponding extent, a resistance disposed in an opposed arm of said network, means for passing the output current from said amplifier through a portion of said resistance for rebalancing said network, and means for measuring the output current of said amplifier.

3. Photometric apparatus for measuring the magnitude of a variable condition including the combination of an electronic amplifier having an input circuit and an output circuit, a source of energizing voltage, a self balancing Wheatstone bridge network receiving energizing current from said source and having its equalizing terminals connected to the input circuit of said amplifier, a light sensitive device included in one arm of said network adapted to change in resistance in accordance with variations in said condition and adapted to unbalance said network to a corresponding extent, a resistance disposed in an opposed arm of said network, and means for passing the output current from said amplifier through a portion of said resistance for rebalancing said network.

4. Photometric apparatus for measuring the magnitude of a variable condition including the combination of an electronic amplifier having an input circuit and an output circuit, a source of energizing voltage, a self balancing Wheatstone bridge network receiving energizing current from said source and having its equalizing terminals connected to the input circuit of said amplifier, a light sensitive device included in one arm of said network adapted to change in resistance in accordance with variations in said condition and adapted to unbalance said network to a corresponding extent, a resistance disposed in an opposed arm of said network, means for passing the output current from said amplifier through a portion of said resistance for rebalancing said network, and means for measuring the output current of said amplifier.

5. Apparatus for measuring the magnitude of a variable condition including the combination of an electronic amplifier having an input circuit and an output circuit, a source of voltage for energizing the output circuit of said amplifier, a self balancing network having a pair of terminals which normally are at the same potential connected to the input circuit of said amplifier, means included in a branch of said network adapted to unbalance said network to produce a difference in potential between said terminals in accordance with variations in said condition, an impedance disposed in another branch of said network, and means for passing the output current from said amplifier through a portion of said impedance for reducing said difference in potential.

6. A self balancing network including an impedance device in one branch the potential drop across which is adapted to be varied to produce an unbalanced E. M. F. in said network, an impedance device in another branch of said network the potential drop across which is adapted to be varied to rebalance said network, and electronic amplifying means having an input circuit directly electrically connected to said network to respond to unbalance of said network and an output circuit directly electrically connected to said second mentioned device to control the potential drop thereacross responsively to network unbalance.

7. A self balancing bridge network including an impedance device in one arm the potential drop across which is adapted to be varied to produce an unbalanced electromotive force in said network, an impedance device in another arm of said network the potential drop across which is adapted to be varied to rebalance said network, electrical valve means having an input circuit and an output circuit electrically controlled by the input circuit to control the potential drop across said second mentioned impedance device, electrical connections between the output circuit of said electrical valve means and said second mentioned impedance device, and electrical connections to directly control the input circuit of said electrical valve means by said unbalanced electromotive force.

8. A self balancing bridge network including bridge energizing means, an impedance device in one arm of said network the potential drop across which is adapted to be varied to unbalance said network, an impedance device in another arm of said network on which a potential is adapted to be impressed independently of the bridge energizing means to compensate for changes in the potential drop across said first mentioned impedance device and thereby rebalance said network, electrical valve means having an input circuit and an output circuit electrically controlled by the input circuit to vary the potential impressed on said second mentioned impedance device, electrical connections between the output circuit of said electrical valve means and said second mentioned impedance device, and electrical connections to directly control the input circuit of said electrical valve means by the unbalance of said network.

9. A self balancing bridge network including an impedance device in one arm the potential drop across which is adapted to be varied to produce an unbalanced electromotive force in said network, a fixed resistance in another arm of said network the potential drop across which is adapted to be varied to rebalance said network, electrical valve means having an input circuit and an output circuit electrically controlled by the input circuit to control the potential drop across said resistance, electrical connections between the output circuit of said electrical valve means and said resistance, and electrical connections to directly control the input circuit of said electrical valve means by said unbalanced electromotive force.

10. A self balancing bridge network including in an arm an impedance device the potential drop across which is adapted to be varied to produce an unbalanced electromotive force in said network, an impedance device in an arm of said network the potential drop across which is adapted to be varied to rebalance said network, electrical valve means having an input circuit and an output circuit electrically controlled by the input circuit to control the potential drop across said second mentioned impedance device, electrical connections between the output circuit of said electrical valve means and said second mentioned impedance device, and electrical connections to directly control the input circuit of said electrical valve means by said unbalanced electromotive force.

11. A self balancing bridge network including bridge energizing means, an impedance device in one arm the potential drop across which is adapted to be varied to unbalance said network, another impedance device in said bridge network arm on which a potential is adapted to be impressed independently of the bridge network energizing means for rebalancing said network, electrical valve means having an input circuit and an output circuit electrically controlled by the input circuit to vary the potential impressed on said second mentioned impedance device, electrical connections between the output circuit of said electrical valve means and said second mentioned impedance device, and electrical connections to directly control the input circuit of said electrical valve means by the unbalance of said network.

12. A self balancing bridge network including an impedance device in one arm of said network the potential drop across which is adapted to be varied to produce an unbalanced electromotive force in said network, an impedance device in an opposed arm of said network, a source of energizing current, a connection between said current source and the energizing terminals of said network, electrical valve means having an input circuit and an output circuit electrically controlled by the input circuit to vary the supply of energizing current to said second mentioned impedance device independently of the bridge energizing current for rebalancing said network, electrical connections between the output circuit of said electrical valve means and said second mentioned impedance device, and electrical connections to directly control the input circuit of said electrical valve means by said unbalanced electromotive force.

13. A self balancing bridge network including an impedance device in one arm of said network the potential drop across which is adapted to be varied to produce an unbalanced electromotive force in said network, a resistance in an opposed arm of said network, a source of energizing current, a connection between said current source and the energizing terminals of said network, electrical valve means having an input circuit and an output circuit electrically controlled by the input circuit to vary the supply of energizing current to said resistance independently of the bridge energizing current for rebalancing said network, electrical connections between the output circuit of said electrical valve means and said resistance, and electrical connections to directly control the input circuit of said electrical valve means by said unbalanced electromotive force.

14. Photometric apparatus including a self balancing bridge network, a light sensitive device in one arm of said network responsive to changes in a variable condition for producing an unbalanced electromotive force in said network, an impedance device in another arm of said network the potential drop across which is adapted to be varied to reduce said unbalanced electromotive force, electrical valve means having an input circuit and an output circuit electrically controlled by the input circuit to control the potential drop across said impedance device, electrical connections between the output circuit of said electrical valve means and said impedance device, and electrical connections to directly control the input circuit of said electrical valve means by said unbalanced electromotive force.

15. Photometric apparatus including a self balancing bridge network, bridge energizing means, a light sensitive device in one arm of said network responsive to changes in magnitude of a variable condition for unbalancing said network to an extent corresponding with said change, an impedance device in another arm of said network on which a potential is adapted to be impressed independently of the bridge energizing means for rebalancing said network, electrical valve means having an input circuit and an output circuit electrically controlled by the input circuit to control the potential drop across said impedance device, electrical connections between the output circuit of said electrical valve means and said impedance device, and electrical connections to directly control the input circuit of said electrical valve means by the unbalance of said network.

16. Photometric apparatus including a self balancing bridge network, a light sensitive device in one arm of said network responsive to changes in magnitude of a variable condition for unbalancing said network to an extent corresponding with said change, a fixed resistance in an opposed arm of said network the potential drop across which is adapted to be varied to reduce said unbalanced electromotive force, electrical valve means having an input circuit and an output circuit electrically controlled by the input circuit to control the potential drop across said resistance, electrical connections between the output circuit of said electrical valve means and said resistance, and electrical connections to directly control the input circuit of said electrical valve means by the unbalance of said network.

THOMAS R. HARRISON.